Figure 2:
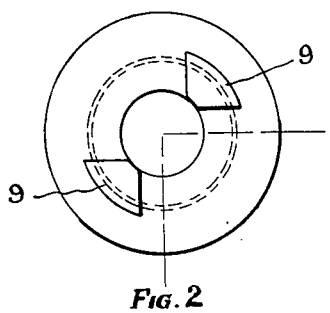

Jan. 9, 1934. T. GRISWOLD, JR 1,942,694
TUBULAR HEATING ELEMENT
Filed May 23, 1929 2 Sheets-Sheet 1

Inventor
Thomas Griswold, Jr.

Jan. 9, 1934.  T. GRISWOLD, JR  1,942,694
TUBULAR HEATING ELEMENT
Filed May 23, 1929  2 Sheets-Sheet 2

Inventor
Thomas Griswold, Jr.

Patented Jan. 9, 1934

1,942,694

UNITED STATES PATENT OFFICE 1,942,694

TUBULAR HEATING ELEMENT

Thomas Griswold, Jr., Midland, Mich., assignor to The Dow Chemical Company, Midland, Mich., a corporation of Michigan Application May 23, 1929. Serial No. 365,376

7 Claims. (Cl. 257—248)

The present invention relates to tubular heat transmitting elements and in particular to an improved tube for evaporators of the Mantius type.

Heretofore, where the tubes were fastened in place externally as shown in U. S. Patent 1,054,926 to Mantius, the removal of a leaking tube required not only entrance into the interior or the evaporator in such manner as to permit the removal of the tube, but also required the removal of the steam belt in order to unfasten it. One way of avoiding the necessity of removing the steam belt when making tube repairs has been either to thread the end of the tube or place a threaded nipple therein and then screw the so prepared tube into a corresponding threaded opening in the tube sheet until it tightens on the gasket placed between the tube and tube sheet. The placing of tubes in this manner, however, invariably results in a substantial percentage of them developing leaks at the gasket immediately or shortly after being placed in active service. From observation such leakage appears to be due to the rotary sliding motion of the tube over the gasket during tightening down. Such rotary motion in some cases scuffs, cracks or otherwise injures the joint surfaces so that a leak shows up at the preliminary test or after active service is started. If such a leak is not repaired shortly after it starts, the tendency is for the leaking fluid to score or cut the gasket contacting surface at the leaking area. Such leaking, I have found, if allowed to continue for substantial periods of time will not infrequently necessitate refacing the gasket bearing surfaces before a satisfactory repair can be made.

I have invented a new type tube, the use of which eliminates the need of removing the steam belt to make tube or gasket replacements if employed in a Mantius type evaporator, and at the same time may be tightened down without sliding action over the gasket with its attendant troubles.

Among the principal objects of my invention is the production of a tube that may be easily removed for repairs, and which may be installed without sliding action over the gasket or seat when being tightened in place. A further object is to provide a tube that is highly resistant to corrosion and at the same time has a high coefficient of heat transfer. A further object is to provide a tube having relatively thin walls which not only facilitates heat transfer but reduces the tube cost where relatively expensive materials are used. Other objects and advantages will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of the various ways in which the principle of the invention may be used.

In said annexed drawings:—

Figure 4:
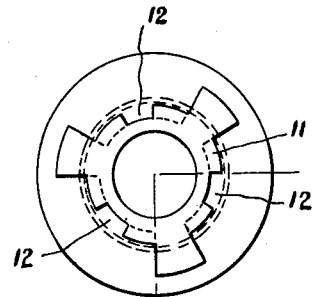
Figure 1:
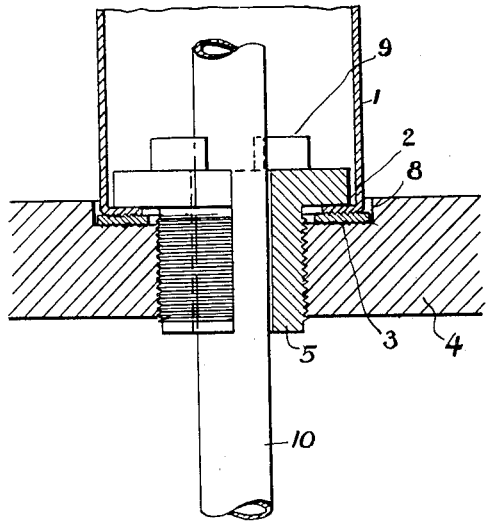
Figure 3:
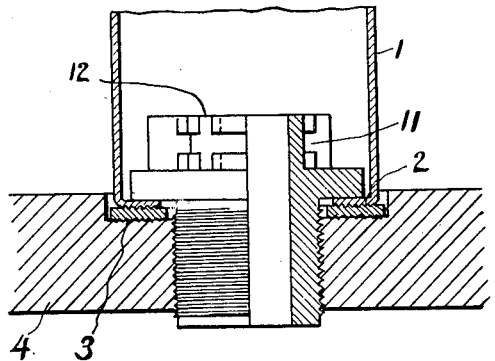
Figure 6:
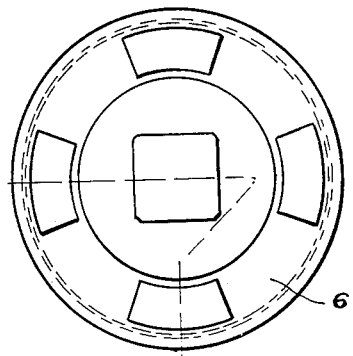
Figures 7, 8:
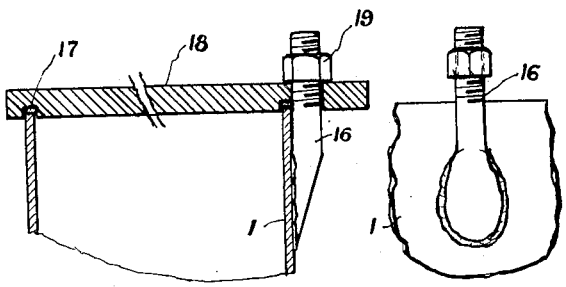
Figure 5:
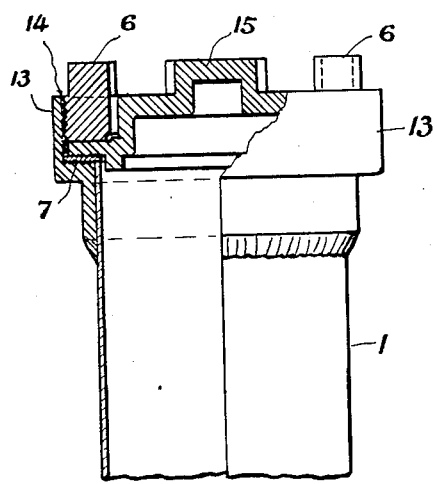
Figure 9:
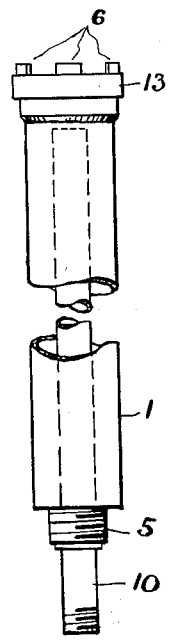

Fig. 1 shows a partially sectioned view of one preferred method of fastening the tube to the tube sheet. Fig. 2 is a plan view of stud 5 shown in Fig. 1. Fig. 3 is a view of a modified form of the construction shown in Fig. 1. Fig. 4 is a plan view of the stud shown in Fig. 3. Fig. 5 is a partially sectioned view showing one preferred method of closing the free end of the tube by means of a cap. Fig. 6 is a plan view of Fig. 5. Figs. 7 and 8 show a modification of Fig. 5 wherein the cap is held in place by means of studs that are welded to the side of the tube. Fig. 9 shows one preferred assembly of my improved tube.

In general, my improved tubular heating element consists of a tube 1 flanged inwardly at the bottom 2, mounted with or without a gasket 3 between it and the tube sheet 4 in such manner that when stud 5 is tightened down a tight joint is made without rotary sliding action taking place over the seat or over the surface of the gasket. In similar manner the upper or free end of the tube is so constructed that when ring 6 or nut 19 is tightened down a tight joint is made without rotary sliding action taking place over the seat or over the surface of gasket 7.

Referring more particularly to the drawings, tube 1 may be constructed of any metal or other material having satisfactory mechanical and corrosion resisting properties. The lower end of the tube may be flanged in at 2, or if the tube happens to be cast, such flange might be cast in place. In preparing the tube for use, the inner and outer faces of flange 2 are preferably faced off smooth, while the outer face which bears against the gasket 3 preferably has a number of relatively small concentric grooves cut into it as an aid to prevention of flowage of the gasket while tightening and to help prevent leaks when subjected to pressure. The tube sheet 4 should be faced or even counter-bored as at 8 to provide a level surface for the gasket. In like manner to the gasket contacting face of flange 2, the tube sheet face under the gasket is preferably grooved with relatively small concentric circles. The tube sheet 4 is bored and tapped corresponding to the threading on hollow stud 5. Stud 5 may be constructed with lugs 9 on its upper surface so that a tightening tool may be passed down the interior of tube 1 and by engaging with said lugs make possible the drawing down of the stud so as to tighten the tube 1 against gasket 3 and tube sheet 4. This particular type of stud, however, would ordinarily require the removal of inlet steam pipe 10 in order to permit stud 5 to be held while inserting or removing with the tube setting in place as shown, one convenient holding means for the stud being a spring mounted on the end of the stud wrench in such manner as to apply friction to the inner surface of the stud and thus prevent its falling off on being raised or lowered. The stud, however, shown in Figs. 3 and 4 is equipped with undercut portions 11 which will permit a tool to be used without the removal of pipe 10, such tool preferably being of hollow or tubular construction which will slip over tube 10. The tool will further have pins or equivalent projections which will pass through the notches 12 as the tool is approached to the stud, and upon turning the tool such projections will pass into grooves 11 in such manner that the stud 5 will be gripped by the tool and may be held by it while lowering it into place or raising it as the case may be. The upper end of the ring, as shown in Fig. 5, may have a ring 13 secured thereto as by welding in such manner that the tube may be chucked and internally threaded at 14 and also faced and scored for gasket 7 with small concentric circles. Cap 15 may be either cast, stamped or otherwise made into a convenient usable form, such as the one shown. Such cap prior to use may be chucked, and faced and scored with small concentric circles on the gasket bearing area and faced smooth on the side in contact with tightening ring 6. Ring 6, as noted, is provided with lugs that will permit easy engagement of a bar or wrench for tightening the cap into place where using a cap such as shown in Figs. 5 and 6. A stud construction, such as shown in Figs. 7 and 8 may be used. In this case stud 16 may be flattened and welded to the outside of tube 1 as shown, there being several such studs placed around the end of the tube. Gasket 17 is inserted and cap 18 slipped into place where it can be drawn down tightly onto gasket 17 and end of tube 1 by means of nut 19, it being preferable, of course, to cut small concentric circles on the bearing surfaces contacting with the gasket.

While the stud 5 may be made out of any satisfactory material, it is ordinarily preferable to use a material that will withstand corrosion to a satisfactory extent and may be readily removed when tube or gasket renewal is necessary. Accordingly if a tube is expected to be in service for a considerable length of time, it may be advisable to make the stud from a material which satisfactorily resists corrosion and is readily removable, such as brass, although iron, steel or other materials may be satisfactorily used in some instances. The gaskets to be used will depend in general upon the service and temperature to which they are to be subjected. In some cases it may be possible to omit the use of gaskets where a good joint can be made and conditions of operation will permit such practice. Tube 1, which may be constructed of any suitable metal or other material should among other desirable properties be capable of resisting corrosion to a satisfactory extent. For instance where concentrating caustic soda, cast iron tubes are relatively satisfactory. However, I have found that where the tubes are made from nickel they will resist corrosion for a much longer and almost indefinite period of time. Nickel tubes also show high corrosion resistance when used to concentrate sodium chloride, ammonium hydroxide, sodium carbonate, calcium chloride, magnesium chloride, acetic acid, oxalic acid, tartaric acid, citric acid, etc. In like manner tin is also commonly used for concentrating fruit acids. Synthetic methyl salicylates may be satisfactorily handled or distilled in contact with tin or silver tubes. Alloy steels and plated metals are coming into more and more common use for distilling or concentrating materials of corrosive nature. In some cases where extremely corrosive materials are to be treated the tubes may be enameled or even made of glassware or stoneware where conditions will permit it. Contamination of the final product with metal dissolved from the apparatus is sometimes highly objectionable. This further emphasizes the desirability of high corrosive resistance of the materials being used and is particularly applicable to the tubes which are normally subjected to conditions favoring corrosion.

Tubes of the Mantius type as is well known should in general be anchored at the upper or free end to minimize vibration which tends to loosen the gasketed joints, particularly those at the tube sheet. My improved tube may be anchored in any convenient manner and may even have the caps so constructed that they contact with each other and automatically serve as an anchor for the tops of the tubes, thus making unnecessary the use of a grid or other devices now in common use for this purpose.

While I have shown but two forms of stud 5 I do not wish to be limited to those particular forms, as there are numerous other equivalent ways in which these studs may be made without departing from the spirit of my invention. In like manner I have shown but two ways of closing the upper or free end of the tube with a cap. Such cap may be held in place in many other equivalent ways, such for instance by means of an internally threaded ring that would tighten down on the cap in somewhat similar manner to that shown in Fig. 5, excepting that threads on the tube would be external instead of internal. I have further described my tubular element in terms of a heating tube, it, of course, being understood that the heat may be transmitted to or from the tube depending on whether heat is being removed or furnished to the material surrounding it.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:—

1. In an article of manufacture, the combination of a tube having one open end and the other end flanged inwardly, a hollow threaded flanged stud freely insertable in said tube through the open end thereof, freely removable therefrom, and adapted to engage with the flange of the tube, so that when the stud is screwed into a suitably threaded hole in an associated member, the tube may be drawn up to said member by so screwing in the stud without requiring that the tube itself be rotated with the stud, and removable means for closing the open end of the tube.

2. A heating element consisting of a tube open at both ends, having an inner annular flange at one end thereof and a seat for a closing cap at the other, a threaded hollow fastening stud insertable within the tube from the cap-closable end thereof, said stud having an outer annular flange adapted to engage with the inner face of the annular tube-flange, said hollow stud having a lower extension engaging with a threaded hole in a tube sheet to which said tube is to be secured, said stud having engaging lugs for a wrench insertable in the tube from the cap-closable end thereof, whereby the flanged end of the tube may be drawn up to a seat therefor on the tube sheet without rotating the tube, a removable cap for closing the other end of said tube and means to draw said cap to the seat therefor on the tube.

3. In an article of manufacture, the combination of a tube, one end of which is flanged inwardly, a one-piece removable means engaging with a tube sheet and insertable in the tube to engage therein with the inner face of said flange and adapted by application of a suitable tool introduced into the tube to tighten the tube in place without rotating said tube by drawing said flange to a seat, a cap for the other end of the tube and threaded means for tightening such cap on a sealing gasket thereon in an axial direction.

4. In an article of manufacture, the combination of a tube, one end of which is flanged inwardly, said flange being faced on at least one side and grooved on the outer face thereof, a removable hollow stud engaging with a tube sheet and insertable in the tube to engage therein with the inner face of said flange and adapted by application of a suitable tool introduced into the tube to tighten the tube in place without rotating it, a faced and grooved cap for the other end of the tube and threaded means for tightening such cap in an axial direction, a sealing gasket therefor and a grooved gasket seat on the open end of the tube.

5. An article of manufacture comprising a tubular member open at the ends, an inner flange at one end thereof, a removable hollow stud insertable in the tubular member and having a flange adapted to engage therein with said inner flange in the tubular member and adapted further by application of a suitable tool introduced into the tube to tighten the tube in place against a threaded fixed member of the apparatus associated with the said tubular member without turning said tubular member, a cap adapted to close the other end of the tubular member by seating upon the end thereof, and means for tightening said cap upon its seat without turning said cap relative to said tube.

6. An article of manufacture comprising a metallic tubular member open at the ends, an inner flange at one end thereof, a removable hollow stud insertable in the metallic tubular member and having a flange adapted to engage therein with said inner flange in the metallic tubular member and to tighten same against a threaded fixed member of the apparatus associated with said tubular member without turning said tubular member, such tightening being done by means of a suitable tool inserted in said member, a cap adapted to close the other end of the tubular member by seating upon the end thereof, means to tighten said cap upon its seat without turning said cap relative to said tube and a gasket between said tubular member and at least one of the co-acting seats.

7. An article of manufacture comprising a tubular member open at the ends, an inner flange at one end thereof, a removable hollow stud insertable in the tubular member having a flange adapted to engage therein with said inner flange in the tubular member and adapted by application of a suitable tool introduced into the tube to tighten same against a threaded fixed member of the apparatus associated with said tubular member by drawing said flange to a seat without turning said tubular member, a cap adapted to close the other end of the tubular member by seating upon the end thereof, a ring-like threaded means to tighten said cap upon its seat without turning said cap relative to said tube and a gasket between said tubular member and at least one of the co-acting seats.

THOMAS GRISWOLD, Jr.